United States Patent [19]

Merlo

[11] Patent Number: 4,686,362

[45] Date of Patent: Aug. 11, 1987

[54] INCREMENTAL OPTICAL ENCODER WITH A TUNED VERNIER

[76] Inventor: Michele Merlo, Via Monterosa, 61, 20100 Milan, Italy

[21] Appl. No.: 847,474

[22] Filed: Apr. 3, 1986

[30] Foreign Application Priority Data

Apr. 26, 1985 [IT] Italy ............................ 20510 A/85

[51] Int. Cl.$^4$ ............................................. G01D 5/34
[52] U.S. Cl. ......................... 250/231 SE; 340/347 P; 250/237 G
[58] Field of Search ............. 250/231, 231 SE, 237 G; 340/347 P; 356/395

[56] References Cited

U.S. PATENT DOCUMENTS

| | | | |
|---|---|---|---|
| 3,725,902 | 4/1973 | Finnegan | 340/347 P |
| 4,268,747 | 5/1981 | Becchi et al. | 250/231 SE |
| 4,512,184 | 4/1985 | Ernst et al. | 250/231 SE |
| 4,628,200 | 12/1986 | Tinios | 250/231 SE |

*Primary Examiner*—Edward P. Westin
*Assistant Examiner*—Charles F. Wieland
*Attorney, Agent, or Firm*—Oblon, Fisher, Spivak, McClelland, & Maier

[57] ABSTRACT

The encoder comprises a rotor formed from a disc and a window-containing ring surrounding the disc periphery and able to undergo adjustment movements with respect to the disc. The encoder also comprises reading units formed from a light emitting diode, a window-containing screen and a phototransistor. The screens of these units can also undergo adjustment movements in order to obtain suitable phase differences between the signals emitted by the phototransistors.

6 Claims, 5 Drawing Figures

INCREMENTAL OPTICAL ENCODER WITH A TUNED VERNIER

BACKGROUND OF THE INVENTION

This invention relates to an incremental encoder comprising a rotor peripherally possessing a circular succesion of windows, and at least one reader formed from a pair of reading units for reading the passage of the windows, said units comprising a light emitting diode, a screen provided with windows, and a light-sensitive semiconductor (phototransistor). Encoders are electro-optical instruments for measuring the angular rotation of a shaft by means of a series of pulses. they are of very widespread use, and their operation is known. They comprise: a rotor provided peripherally with a large number of radially elongated small-dimension windows, a monochromatic light emitting diode, a screen disposed in front of the diode and provided with several windows equal to those of the rotor, and a phototransistor which receives the light emitted by the diode and passing through the screen and rotor windows, when the rotor windows at least partly face those of the screen. The phototransistor emits an electrical signal which is a function of the light received. If the rotor windows do not at least partly face the screen windows, the light does not pass and the phototransistor does not conduct. For each complete revolution of the rotor the phototransistor conducts a number of times equal to the numer of rotor windows. The distance between the centres or centre lines of two adjacent windows represents the pitch, and the number of windows is equal to the number of signals emitted per revolution. If each window has a width of one half the pitch, the pattern of the phototransistor current is substantially sinusoidal during the rotor rotation, and during one revolution the number of sinusoids is equal to the number of rotor windows.

Encoders also comprise a second diode-phototransistor-screen assembly, in which the screen is displaced by one half of a window (i.e. 90 electrical degrees) with respect to the screen of the first assembly, so that in this second assembly the signal from the relative phototransistor is displaced in phase by 90° from the signal of the first during rotation. The two output signals from the two phototransistors are converted into two square waves, which are such that when the rotor rotates in one direction the first wave ascends when the other is low, whereas when the rotor rotates in the opposite direction the first wave ascends when the other is high. It is thus possible to differentiate between the pulses generated in one direction of rotation from those generated in the reverse direction of rotation.

Of all the pulses which form the square waves, both the ascending wave fronts and the descending wave fronts are counted to finally obtain four pulses for each rotor window.

The most important characteristic of an encoder is the accuracy with which it indicates the angle of rotation undergone by the shaft associated with the rotor.

It is well known that in order to indicate a value with great accuracy, many digits and thus many rotor windows are required. Int he current state of the art, the maximum number of windows in a ring of 50 millimetres diameter is 3000, to obtain 12,000 pulses per revolution counting all four wave fronts. In such an encoder, the width of each window is 26 microns and the displacement of one half of a window is therefore 13 microns.

Such a rotor, shown diagrammatically in plan view in FIG. 1, has two defects, the first being the off-centering, and the second the non-uniform distribution of the windows.

These two defects cannot be overcome. this is because off-centering always exists in any rotary member, and non-uniform window distribution necessarily results from the photographic and chemical method generally used for forming the windows and which is influenced not only by the imperfections in the initial design, but also by the photograph (such as parallelism of the design and the photographic plate) and by the lens.

FIG. 1 shows, of a known encoder, the rotor with two reading units. In this rotor, indicated by R, the windows are indicated by 11, the first reading unit by 12, and the second unit with its screen displaced through one half of a window by 14. The theoretical centre of the rotor is indicated by 15, and the actual centre, which is effectively off-centre, by 13. In FIG. 1 it can be seen that if each window is assumed to be 26 microns wide and the screen of the unit 14 is assumed to be displaced by one half of a window, ie by 13 microns, even if the windows were all absolutely perfect a distance between the centres 15 and 13 of only 6.5 microns would be sufficient to displace the unit 14 through one half of a window, thus making it useless. The displacement of 90 electrical degrees would thus become either 0° or 180°.

Taking into account the additional fact that the non-uniform distribution of the windows can reach 10–20 microns, it is immediately apparent that the assembly cannot operate correctly. Encoder manufacturers have sought to avoid these diffiulties by mounting the two reading units very close together, as shown in FIG. 2. In this manner, neither the off-centering nor the non-uniform distribution of the windows should alter the phase difference between the two signals by very much. However, both the off-centering and the non-uniform distribution still exist and, although to a lesser extent, they still influence the inidication of the shaft angle, which is the very quantity which should be accurate.

For completeness, it must also be stated that in encoders each reading unit is balanced by a further unit displaced through 180 electrical degrees from the first. The displacement in electrical degrees indicates the phase angle between the output signals of the phototransistors of two reading units. A displacement of 180 electrical degrees signifies that these signals are in opposition. This is obtained by displacing the screen of one unit by on half of a pitch, ie by one window, relative to the screen of the other unit. The known purpose of this 180° displacement is to enable a better reading to be fed to a voltage comparator in order to obtain the square wave signal. The two reading units displaced in phase by 180 electrical degrees form a "reader".

SUMMARY OF THE INVENTION

A first object of the present invention is to provide an encoder in which the indication of the angular shaft position is not influenced either by the off-centering or by the non-uniform distribution of the rotor windows.

A further object of the present invention is to increase the number of pulses per revolution for equal numbers of rotor windows, to obtain greater accuracy in the indication of the angular position.

These and further objects which will be more apparent from the detailed description given hereinafter are attained by an encoder of the indicated type, characterised essentially in that the rotor comprises a peripheral annular member, which carries the circular succession of windows and on which there act thrust means which can be adjusted so as to correct the off-centering and the non-uniform distribution of the windows.

According to an important aspect of the invention, in order to obtain output signals which are exactly out of phase and thus increase the number of pulses per revolution for equal numbers of rotor windows, the unit screens are individually adjustable along a limited path which at least approximately coincides with the circular succession of rotor windows.

With the invention not only is it possible ot obtain an exact phase difference of 90 electrical degrees between the signals emitted by two reading units such as the units 12 and 14 of FIGS. 1 and 2, but it is also possible to arrange other reading units, even one every 10°, to thus obtain signals which are variously phase-displaced and thus obtain a very large number of pulses per revolution. In this manner a vernier reading is made. To obtain such a result, it is necessary only to adjust the position of each screen so as to bring it into correct phasing with the other units. This adjustment thus represents a setting or "tuning" operation.

BRIEF DESCRIPTION OF THE DRAWINGS

The invention will be more apparent from the detailed description of a preferred embodiment given by way of non-limiting example hereinafter and illustrated on the accompanying drawing, in which.

DETAILED DESCRIPTION OF THE PREFERRED EMBODIMENT

Figure 3:
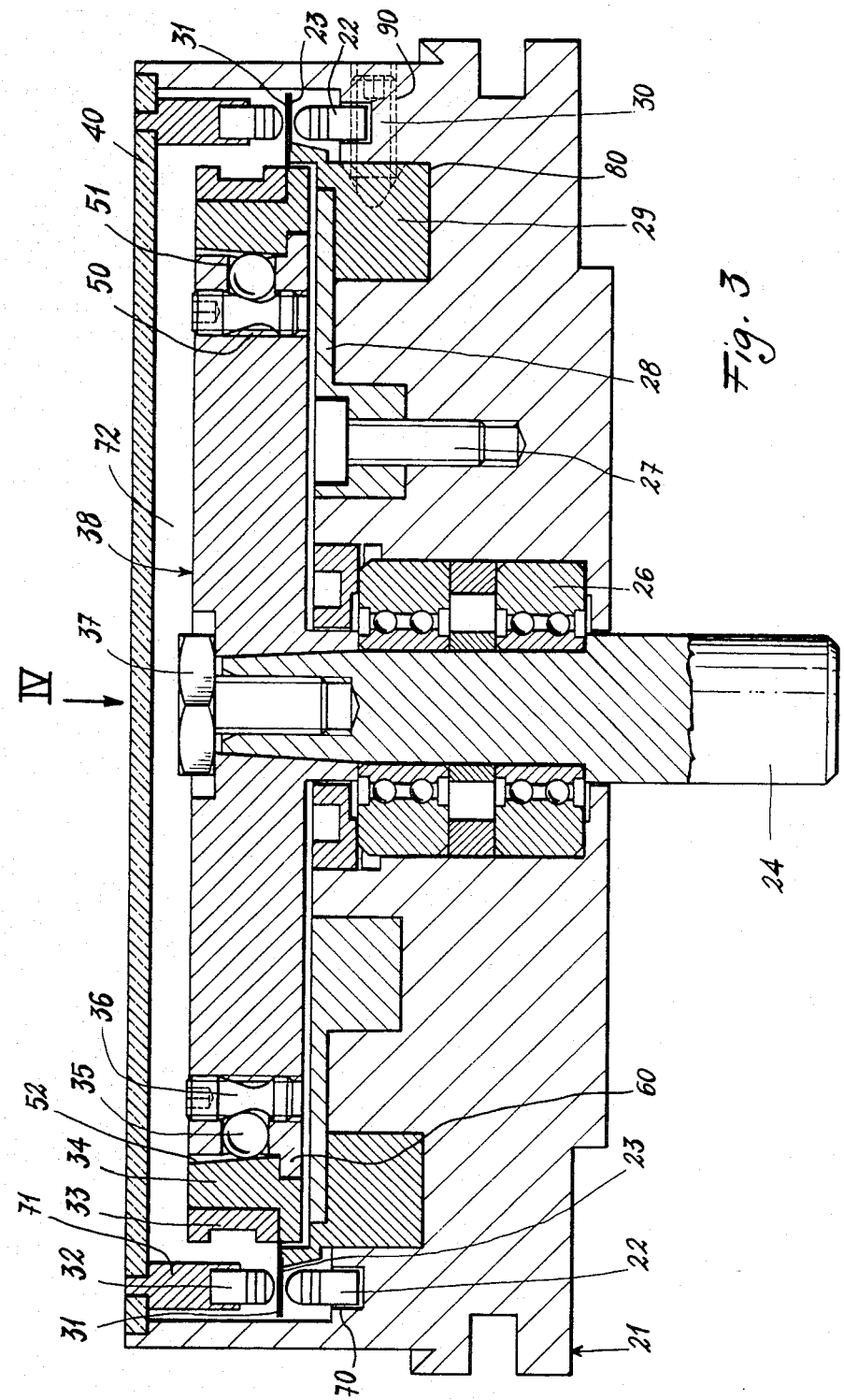
FIG. 3 is a diametrical section through an encoder according to the invention.
Figure 4:
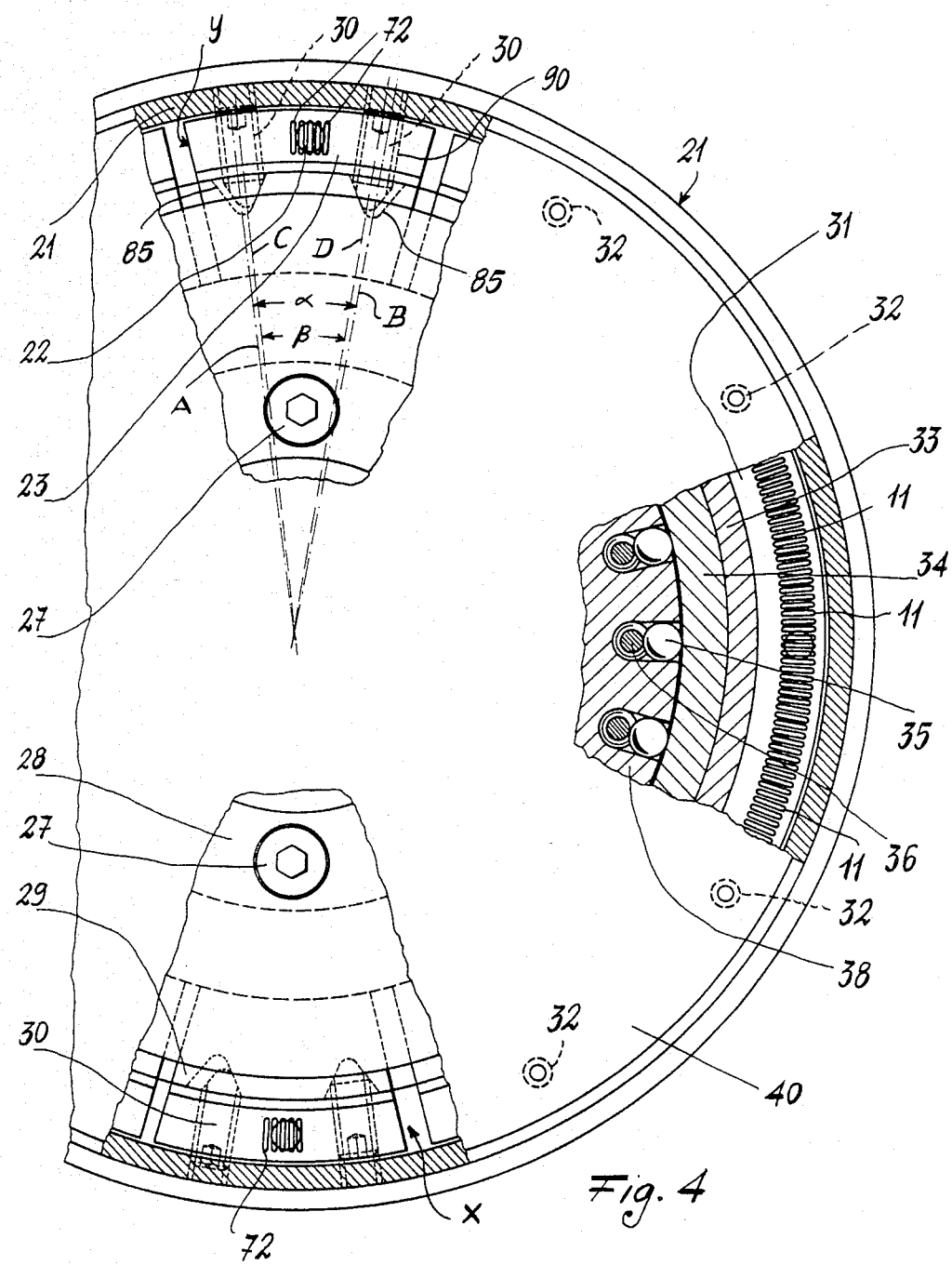
FIG. 4 is a partial view with parts cut away, taken in the direction of the arrow IV of FIG. 3.

The encoder of the embodiment shown in FIGS. 3 and 4 comprises a rigid cup-shaped casing 21, in which a shaft 24 is supported by ball bearings 26. A disc 38 is connected to the shaft by a screw 37 which is screwed into the shaft. Along the disc periphery there are provided uniformly spaced-apart axial threaded bores 50, each communicating with a radial through bore 51. A profiled screw 36 is disposed in each threaded bore 50. The profile is of goblet or cone shape, ie such that its section increased in width towards the outer end of the screw starting from its smallest width which is towards the other end of the screw. In the radial bore 51 there is disposed a ball 35, the diameter of which exceeds the length of the bore, so that parts of the ball project from this latter. By adjusting the screw 36 it is therefore possible to vary the position of the ball 35 in the bore 51 which houses it.

The balls are designed to act on the inner frusto-conical face 22 of a composite metal ring formed from a first inner ring 34 and an outer ring 33, which are joined together in any known manner (for example by keying) and clamp between them the inner periphery of an annular lamina 31, for example of beryllium copper, which projects outwards in the manner of a flange and is provided with a circular succession of radial windows 11 distributed along the projecting part of said annular lamina 31. The inner ring 34 rests on a peripheral step or flange 60 of the disc 38 by the effect of the cooperation between the balls 51 and the conical surface 50.

It is apparent that by adjusting the screws 36 it is possible to vary the position of the geometrical centre of the assembly 31, 33, 34 with respect to the axis of rotation of the disc 38, and thus eliminate any eccentricity. It is also possible by these means to elastically deform the composite ring in a selective manner to enable the non-uniform distribution of the windows to be compensated.

Along the periphery of the annular lamina 31 at the level of the windows 11, there is provided a succession of uniformly spaced-apart reading units formed from a monochromatic light emitting diode 22, a phototransistor 32, these being aligned with each other, and a screen 23 interposed between these latter and between the annular lamina 31 and the diode 22.

Figures 1, 2:
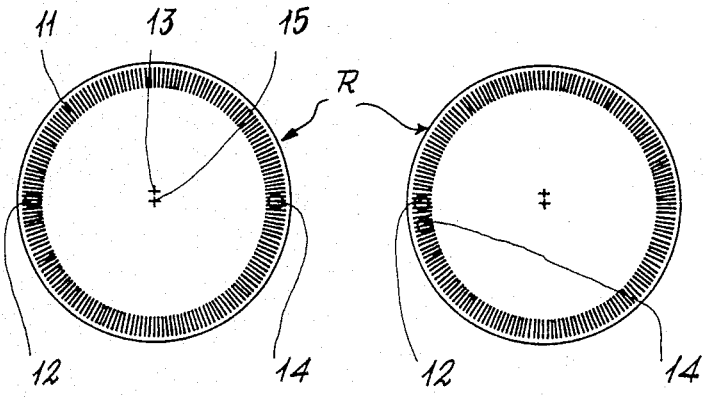
FIGS. 1 and 2 are a diagrammatic plan view of conventional encoders.
Figure 5:
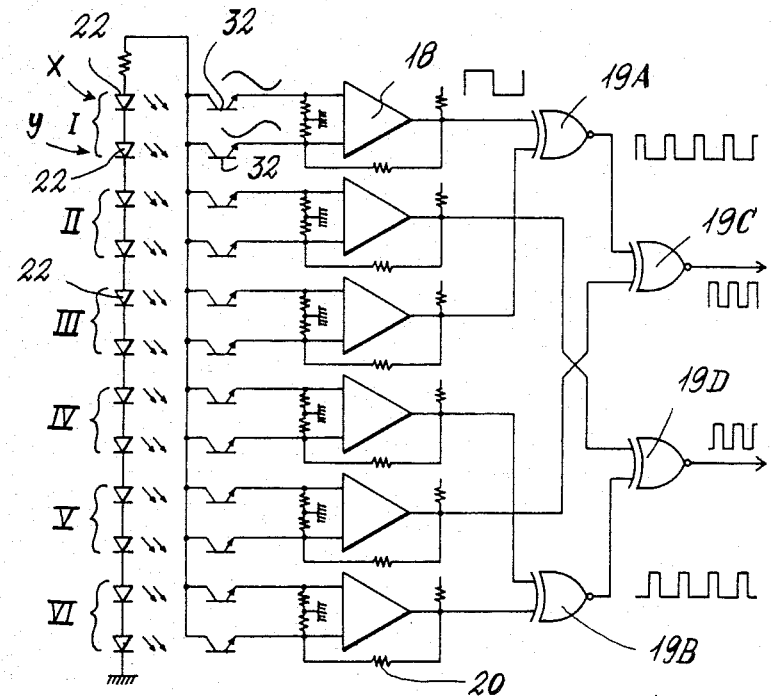
FIG. 5 is a diagrammatic representation of the circuit of the encoder of FIGS. 3 and 4.

The diodes 22 are supported in any known manner in seats 70 present in the casing 21, whereas the phototransistors 32 are mounted in sockets 71 projecting from and supported by a plate 40, for example of glass-reinforced plastic, on which the electronic circuit of FIG. 5 is formed. The plate 40 is connected peripherally to the casing 21 in any known manner, and closes the compartment 72 in this latter which houses the disc 38 with its associated members, and the reading units.

Each screen 23 is provided with a series of windows 72 equal to the rotor windows 11, they having the same pitch and being located in line with the diode 22 and phototransistor 32. the screen consists for example of a thin lamina of beryllium copper cemented or otherwise fixed in a projecting manner to a block 29 in the shape of a circular ring sector disposed in an annular slot 80 provided in the casing 21.

The blocks 29 are held in situ in the annular slot 80 by a ring 28 fixed to the casing 21 by screws 27. Each block 29 comprises in its outer side a pair of spaced-apart blind conical holes 85 of radial axis. Screws 30 with conical inner ends are designed to cooperate with the walls of said holes by being screwed into bores 90 of radial axis provied in the casing 21. The angle $\alpha$ between the two radii A, B which contain the axes of the conical holes 85 is greater than the angle $\beta$ between the two radii C, D which contain the axes of the screws 30. The result is that by adjusting the pairs of screws 30 it is possible to vary within certain limits the peripheral position of the relative block 29 in the slot 80 and thus the position of the relative scrren 23 and its windows 72 with respect to the corresponding diode 22 and phototransistor 32, to finally obtain the required phase difference between the output signsl from the various reading units.

The encoder of the example provides 36,000 pulses per revolution and thus has an absolute incremental angle accuracy of ±0.01° at all points of the revolution. This is an absolute accuracy because as the reading points are distributed along the entire circumference and as they are all always involved, an error greater than ±0.01° is not possible because if there were such an error, the assembly could no longer operate. If it operates, then it is exact, as are all electronic counters. These are unable to err, and if the do err they either err very greatly or are faulty.

In order to obtain the 36,000 pulses per revolution, 3000 windows 11 and twelve uniformly spaced-apart reading units are provided. it should be noted, as stated heretofore, that for balancing purposes the twelve units are different in pairs, in that the two units of each pair are out of phase by 180 electrical degrees. The two units of each of these pairs form a "reader", and thus six readers are provided. For example, in FIG. 4, a reader is formed from the units X and Y which, for reasons only of representational simplicity, are spaced-apart by 180 mechanical degrees along the encoder rotor. It is apparent that the two units of one and the same reader could be disposed differently along the rotor. What is important is that the relative screens 23 must be out of phase by one half of a pitch, ie by one window or 180 electrical degrees. The two unitts pertaining to one and the same reader are connected to the same comparator 18, as shown in FIG. 5.

The twelve reading units are thus equivalent to six readers for the purpose of counting the pulses. The screens of these six readers are adjusted by the screws 36, such that the outputs of the relative phototransistors 32 are out of phase by 30°.

Within one rotor pitch (corresponding to the distance between two adjacent rotor windows 11), each of the six readers generates a sinusoid, these sinusoids differing in phase by 30° from one to the next. By converting these signals into square waves in the comparators 18 (FIG. 5), and then forming a logical combination of these square waves and counting both the ascending and descending sides of this combination, it is possible to obtain a count equal to twelve for each pitch (ie for each rotor window). As there are 3000 pitches (equal to the number of windows 11), each complete revolution of the rotor (ie of the assembly formed by the members 30, 33, 34, 31) corresponds to $12 \times 3000 = 36,000$ pulses.

FIG. 5 shows the electrical circuit diagram for the encoder of FIGS. 3 and 4. The figure in question shows the wave forms at the most important points. This daigram shows the twelve light emitting diodes 22, the twelve phototransistors 32, six voltage comparators 18 for squaring the sinusoids of each reader, four exclusive OR gates 19 for adding the signals (ie for combining them), and resistors 20 for exact current distribution.

As stated heretofore, in relation to the reading units X and Y out of phase by 180 electrical degrees, two reading units differing by 180 electrical degrees form one reader. In the figure under examination, the readers are indicated by the Roman numerals I, II . . . VI. The two said units X and Y pertain to the reader I. The outputs of the phototransistors 32 of each reader are fed to a corresponding comparator 18.

The output signal of the comparators 18 is of square wave. The comparator output signal are mutually out of phase by 30°. The output signals of the comparators associated with the readers I, III and IV (signals mutually out of phase by 60°) are fed respectively to the exclusive OR gates 19A and 19B. A square wave signal is obtained at the output of these gates which is double the frequency of the input signal. The output signals of the gates 19A and 19B are out of phase. The signals of the gate 19A are fed to the gate 19C together with the (phase-displaced) signals deriving from the comparator 18 relative to the reader V, to obtain as output a frequency which is double that originating from the gate 19A. Likewise, the output signals of the gate 19B and comparator 18 of the reader II are fed to the gate 19D to obtain a signal double the frequency of the signal of the gate 19B.

The out-of-phase signals leaving the gates 19C and 19D pass to a normal user circuit in which the count of the ascending and descending fronts of the signals is taken, this being equal to 36,000 for each complete rotor revolution.

Because the rotor windows are 3000 in number, for each revolution there are 3000 sinusoids after the phototransistors 22, 3000 square waves after the voltage comparators 18, and 9000 square waves after all the additions in the exclusive OR gates 19A, B C, D. The counter which counts the ascending and descending fronts of the $9000 + 9000 = 18,000$ square waves gives a resultant count of 36,000 pulses for each complete rotor revolution. In particular, the phases of the sinusoids generated by the phototransistors are in the following order: 0° 180° 30° 210° 60° 240° 90° 270° 120° 300° 150° 330°; the phases of the square waves after the voltage comparators are 0° 30° 60°, 90° 120° 150°; and the phases of the square waves after the exclusive OR gates 19C and 19D are 0° and 90°.

What is claimed is:

1. An incremental encoder comprising: a rotor associated with a shaft and peripherally possessing a circular succession of windows and at least one pair of units for reading the passage of the windows, each unit comprising a light emitting diode, a screen provided with windows corresponding to the rotor windows, and a light-sensitive semiconductor producing an output signal, characterised in that the rotor comprises a peripheral annular member which carries the circular succession of windows, on said annular member there acting thrust means which can be adjusted so as to correct the off-centering between the circular succession of windows and the shaft, and the non-uniform distribution of said windows.

2. An encoder as claimed in claim 1, characterised in that in order to obtain output signals which are exactly out of phase, the screens of the reading units are individually adjustable along a limited path, which at least approximately conincides with the circular succession of windows.

3. An encoder as claimed in claim 1, characterised in that the rotor comprises a discoidal member fixed to the shaft and embraced by the peripheral annular member and supporting this latter, the thrust means being disposed in said discoidal member.

4. An encoder as claimed in claim 3, characterised in that the annular member has a face which faces the discoidal member, and the thrust means act on said face.

5. An encoder as claimed in claim 2, characterised in that the screens of the reading units can be individually displaced along a circular path provided in a stationary casing which contains the rotor and the reading units, said path being constituted by a circular guide in said stationary casing.

6. An encoder as claimed in claim 5, characterised in that the screen displacement is effected by mechanical means which can be controlled from the outside of the stationary casing.

* * * * *